United States Patent [19]

Carpenter

[11] Patent Number: 4,813,583

[45] Date of Patent: Mar. 21, 1989

[54] AERODYNAMIC SHELL FOR BICYCLE LUGGAGE AND BAGS

[75] Inventor: Alan E. Carpenter, Lyons, Colo.

[73] Assignee: Alpine Map Company, Boulder, Colo.

[21] Appl. No.: 422,593

[22] Filed: Sep. 24, 1982

[51] Int. Cl.$^4$ .............................................. B62J 7/00
[52] U.S. Cl. .................................. 224/30 R; 296/78.1
[58] Field of Search ................. 224/30 R; 280/289 R, 280/289 S; 296/78.1, 15; D12/107, 111, 114, 126

[56] References Cited

U.S. PATENT DOCUMENTS

| D. 103,351 | 2/1937 | Stutsman | D12/111 |
| 3,979,147 | 9/1976 | Kelley | 296/78.1 |
| 4,326,728 | 4/1982 | Tatch | 280/289 S |

FOREIGN PATENT DOCUMENTS

| 116009 | 10/1942 | Australia | 296/78.1 |
| 591477 | 4/1959 | Italy | 296/78.1 |

*Primary Examiner*—William A. Cuchlinski, Jr.
*Attorney, Agent, or Firm*—John R. Ley

[57] ABSTRACT

Rigid aerodynamic shells increase the aerodynamic shear efficiency of a bicycle ladened with luggage bags, luggage racks and/or luggage attached to the luggage racks. The aerodynamic shells substantially frontally surround or enclose the luggage bags, racks and luggage attached above the front and rear wheels of the bicycle. The shells are pivotably connected to the bicycle to provide access to the bags, racks and luggage. Contoured luggage bags for connection to the conventional luggage rack are provided to substantially conform to and occupy a majority of the interior space defined by the shells.

20 Claims, 6 Drawing Sheets

Fig_1

Fig_5

Fig_4

Fig_6

Fig_8

Fig_7A

Fig_7B

Fig_7C

Fig_9C

Fig_9A

Fig_9B

AERODYNAMIC SHELL FOR BICYCLE LUGGAGE AND BAGS

This invention generally pertains to bicycles, especially touring bicycles, upon which luggage is supported and carried. More specifically, the present invention pertains to an aerodynamically efficient shell adapted to be attached to the bicycle for the purpose of shielding or enclosing luggage or luggage bags, known as panniers, which are attached to the bicycle. The shell has a rigid configuration which reduces the air resistance or drag created by the luggage and luggage bags and, to a lesser extent, by the rider.

It is typical practice to connect or suspend panniers or luggage bags on each side of the front and back wheels of a touring bicycle. The luggage bags are supported from conventional bag and luggage racks which are attached to the front and rear wheel forks or yokes of the bicycle frame. The bags typically include a releasable support arrangement to allow the bags to be quickly separated from the rack. The luggage, for example a sleeping bag, which is too large or bulky to fit within the bags is directly attached to the rack. In this manner, a considerable amount of gear can be attached to and carried on the bicycle. Of course, the pedaling effort increases with the weight of the gear, but the pedaling effort also increases dramatically because of air resistance or drag caused by the shear bulk of the gear attached to the fully laden bicycle.

Very little effort, if any, has been devoted to improving the aerodynamic efficiency of a fully laden bicycle. Considerable developments have been made in improving aerodynamic efficiency of other types of vehicles, but such developments are largely inapplicable to touring bicycles which are usually ridden at relatively low speeds and which have significant size, bulk and uncertain shape because of the attached luggage. Although improvements in the aerodynamic configuration of the luggage bags themselves may be possible, such improvements are often difficult to achieve in any effective measure. Since most bags are fabricated from flexible cloth-like material, it is virtually impossible to achieve and maintain a rigid predetermined structure necessary for improved aerodynamic effect. It is difficult or impossible to achieve the three-dimensional curves necessary for effective aerodynamic efficiency with a two-dimensional, flexible cloth, and virtually impossible to maintain a desired shape or curvature once the bag becomes fully packed, particularly since the bag may be randomly packed. Of course, providing bags with better aerodynamic characteristics does nothing to reduce the aerodynamic drag caused by the larger, more bulky items which cannot be enclosed within the bags.

SUMMARY

Each one and both of the aerodynamic shells of the present invention achieve substantial improvements in the aerodynamic efficiency of a fully laden bicycle and substantially reduce the pedaling effort required to ride the bicycle. The shells of the present invention provide a relatively rigid and aerodynamically efficient structure to shield or enclose the luggage and luggage bags and luggage racks. A decrease in aerodynamic drag is therefore achieved without dependence on the shape or use of the luggage bags, the ability to confine the luggage to the bags, or the existence or bulk of luggage attached directly to the racks. The shells of the present invention are adapted to be used with and supported from conventional luggage and bag racks attached to the bicycle. Full usefulness of and access to the racks and the luggage bags is maintained. The shells of the present invention decrease the aerodynamic drag and pedaling effort required whether the bicycle is ladened or unladened. The shells of the present invention include aerodynamic surfaces which may induce a slight amount of lift to actually counteract some of the weight of the bicycle and attached gear. Contoured luggage bags adapted to occupy an increased amount of the available space behind or within the aerodynamic shells are also provided.

In accordance with these and other aspects, the present invention comprises at least one, and preferably two, relatively rigid-aerodynamically-shaped shells for shielding or enclosing luggage attached in the vicinity of the front and/or rear wheels of the bicycle. The shells achieve an increased aerodynamic efficiency of the bicycle in the speed range of approximately five to twenty miles per hour, as compared to the same bicycle with the same luggage attached but without the shell. The front shell preferably forwardly surrounds and shields the luggage bags and luggage racks attached to the front wheel support fork of the bicycle. The rear shell substantially encloses the luggage bags and luggage rack attached to the rear wheel support fork of the bicycle. Both shells are pivotably connected to the bicycle frame, and preferably to the luggage racks to move away from the luggage racks and provide access to the racks and the luggage bags. Both the front and rear shells include aerodynamically curved portions and surfaces which reduce or break up the turbulence created by the fan effects of the spokes of the rotating wheels, and thereby increase aerodynamic efficiency. Both the front and rear shells include surfaces of a predetermined shape to provide a slight amount of lift to counteract some of the weight of the luggage. The majority of the increase in aerodynamic efficiency is created by the curvature and shape of the front and rear shells which gently push the air to the outside of the shells and above and to the outside of the rider on the bicycle and thereafter collapse the air behind the rear shell and bicycle without creating undue turbulence, within the preferred operating speed range. The invention also includes contoured luggage bags adapted to be attached to the conventional front and rear luggage racks and which extend within and substantially conform to a significant portion of the interior space shielded or enclosed by the front and rear shells.

The nature and details of the present invention can be more completely understood by reference to the following drawings, description of the preferred embodiment and the claims.

DRAWINGS

FIG. 1 is a frontal perspective view of a front aerodynamic shell and a rear aerodynamic shell attached to a bicycle, in accordance with the present invention.

FIG. 6 is a perspective view of the front aerodynamic shell shown in a down position illustrating pivotable movement of the shell and a front shell connection and support arrangement.

FIGS. 7A, 7B and 7C are respectively side, front and top views of luggage bags in accordance with the present invention which have contoured configurations adapted to fit behind the front aerodynamic shell.

FIG. 8 is a perspective view of one portion or half of the rear aerodynamic shell in a downward pivoted position illustrating a rear shell connection and support arrangement.

FIGS. 9A, 9B and 9C are respectively side, rear and top views of luggage bags in accordance with the present invention which have contoured configurations adapted to fit within the rear aerodynamic shell.

PREFERRED EMBODIMENT

Figure 2:
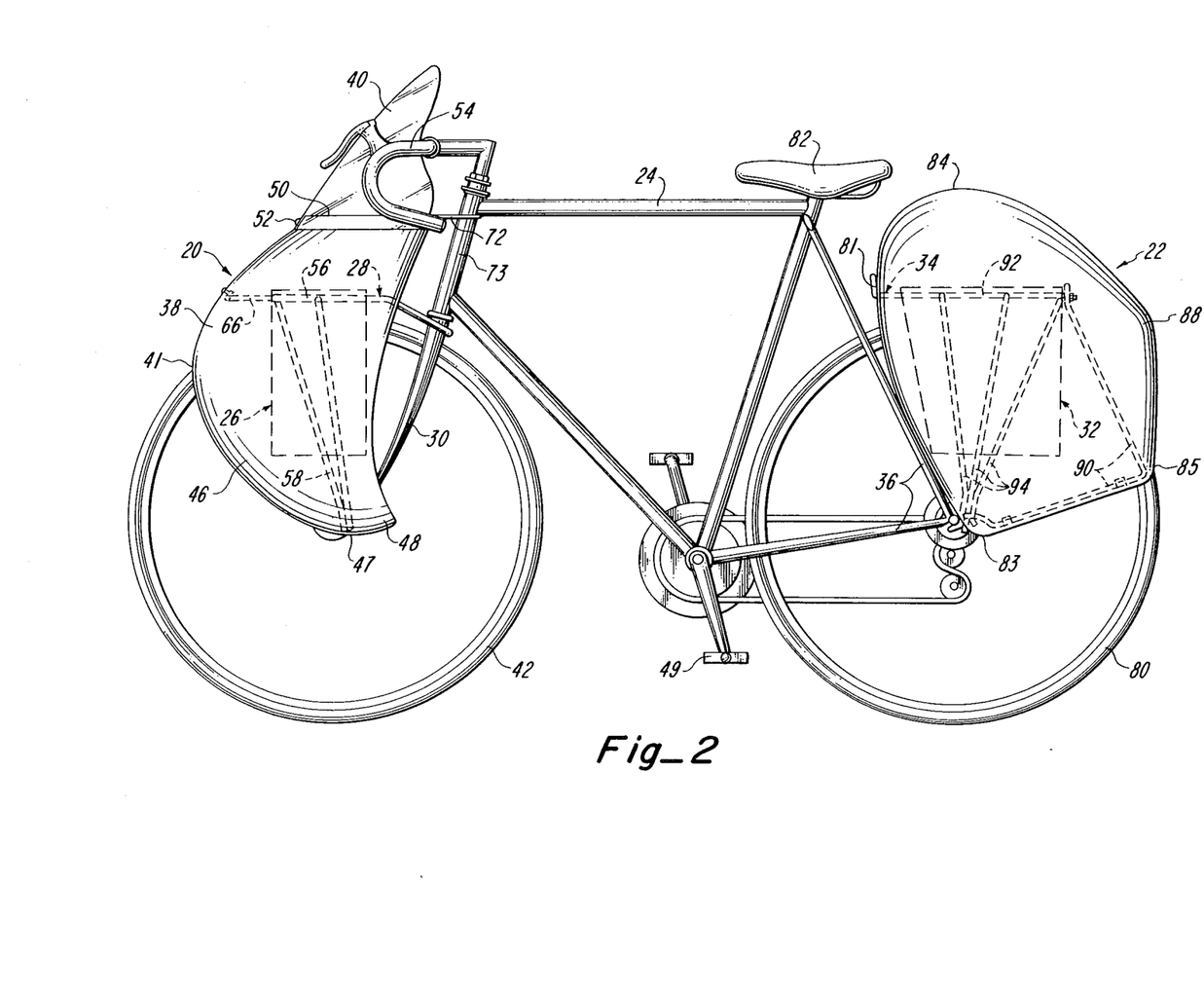
FIG. 2 is a side elevational view of FIG. 1.
Figure 3:
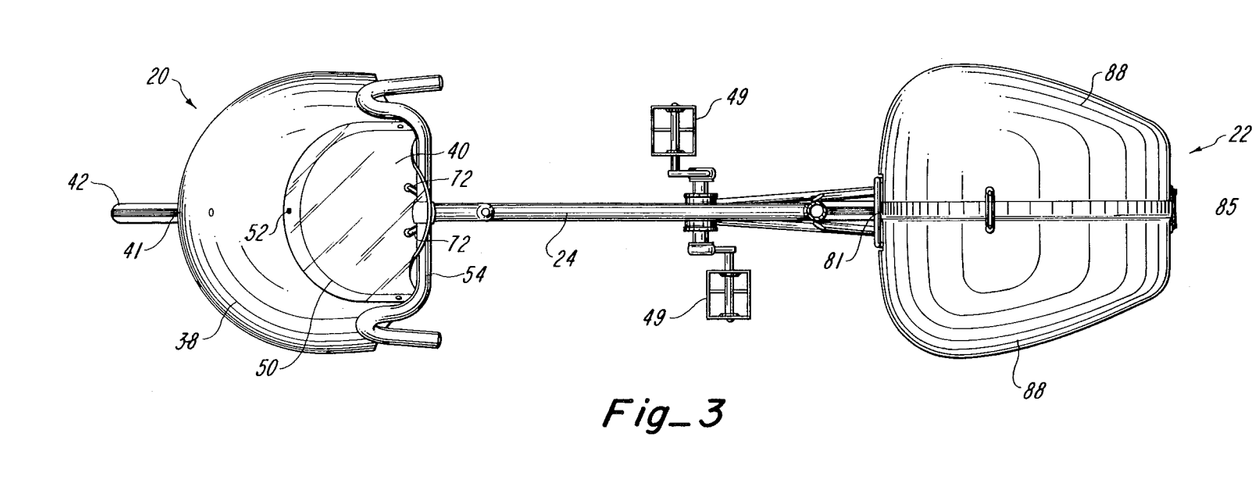
FIG. 3 is a top plan view of FIG. 1, with the bicycle seat removed for clarity.

A front relatively rigid aerodynamically efficient shell 20 and a rear relatively rigid aerodynamically efficient shell 22 are illustrated in FIGS. 1, 2 and 3 as attached to a conventional touring bicycle 24. The front shell 20 substantially surrounds the front and the sides of front luggage bags 26 that are attached to and suspended from a conventional luggage and bag rack 28 which is attached in the conventional manner to the front wheel support yoke or fork 30 of the bicycle 24. The rear shell 22 substantially encloses rear luggage bags 32 that are attached to and suspended from a conventional rear luggage rack 34 which is attached in the conventional manner to the rear wheel support fork 36 of the bicycle 24. The front luggage bags 26 and their contents and/or any additional luggage attached to the front luggage rack 28 is substantially shielded against aerodynamic drag by the shell 20. The rear luggage bags 32 and their contents and/or any additional luggage connected to the rear luggage rack 34 is substantially shielded against aerodynamic drag by the enclosure of the rear shell 22. As a result, the aerodynamic drag on the bicycle 24 and the pedaling effort are substantially reduced, in relation to a fully laden or an unladen bicycle.

The front and rear shells 22 and 24 are of a shape or configuration which gently pushes the air to the outside of the shells and then allows the air to gently collapse behind the shells. This configuration is particularly suited to create improved aerodynamic efficiency during low speed operation in the speed range of up to approximately twenty miles per hour, for example. This speed range is that at which a touring bicycle is normally ridden. At speeds below five miles per hour, the drag is not too significant, but at speeds between five and twenty miles per hour, the drag on a touring bicycle without the shells 20 and 22 is significant. It is within the speed range of five to twenty miles per hour that the present invention achieves its mosty notable benefits.

Figure 4:
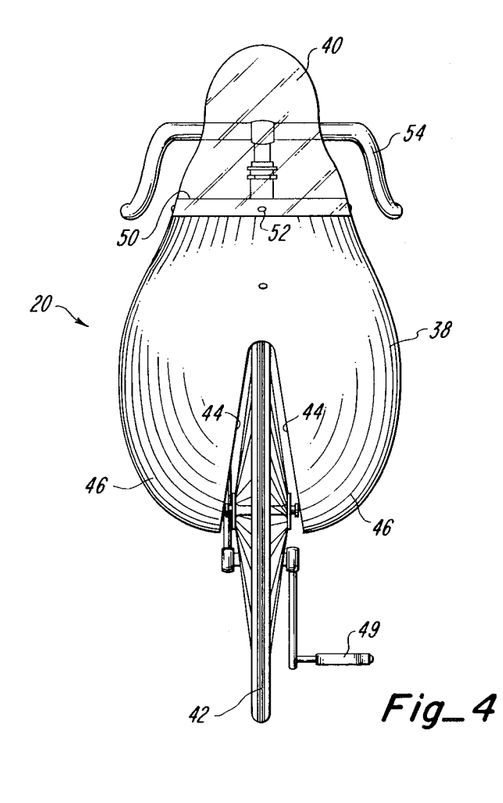
FIG. 4 is a front view of the front aerodynamic shell attached to the bicycle shown in FIG. 1.

The front shell 20 comprises a nose piece 38 of generally rounded configuration, and a transparent wind screen 40 attached at the top of the nose piece 38. The nose piece 38 has a forward facing front surface which is generally of a gently rounded outwardly and rearwardly curving shape of approximately uniform radius curvature both in the longitudinal vertical plane (FIG. 2) and in the longitudinal horizontal plane (FIG. 3). In the vertical transverse plane illustrated in FIG. 4, the outer end of nose piece 38 and attached wind screen 40 achieve an overall pear-shaped profile. The forwardmost point 41 of the nose piece 38 is located at a height approximately commensurate with the top of the front bicycle wheel 42. The outermost transverse points of the nose piece 38, as shown in FIG. 4, are also located approximately commensurate with the top of the front bicycle wheel 42 and to the outside of the handlebars 54.

An upwardly extending slot 44 is formed from the lowermost edge of the nose piece 38 upward toward the forwardmost point 41 of the nose piece 38. The slot 44 divides the majority of the lower portion of the nose piece 38 into a pair of skirts 46 extending on opposite sides of the front wheel 42. The skirts 46 are a continuation of the rounded bulbous configuration of the nose piece. The skirts 46 cover a substantial portion of the longitudinal vertical plane in which the spokes of the front wheel 42 rotate, as shown in FIG. 2. The rotating spokes create a fan effect on the air around the front wheel which can increase the aerodynamic drag. By forcing the air flowing around the front wheel to pass over the skirts 46, the fan effect from the spokes of the front wheel is substantially reduced or broken by the positive pressure of the air in front of the nose piece and the negative pressure behind the nose piece 38. In the longitudinal vertical plane illustrated in FIG. 2, the lower front surface of the nose piece 38 at the skirt 46 curves downwardly and rearwardly to a lowermost point 47 approximately commensurate with the rotational axis of the front wheel 42. This downward and rearward curved front surface creates a slight amount of aerodynamic lift to counteract some of the weight from the luggage attached to the front rack 28. A lower rear surface 48 of each skirt 46 commences a slight rearward and upward curvature from the lowermost point 47 of each skirt 46 and terminates at a height slightly greater than the lowermost point 47. The rearward and upward curvature of the lower rear skirt surface 48 creates a slight positive pressure in the area where the bicycle pedals 49 are turning. The positive pressure in the area of the pedals 49 is regarded as important in counteracting some of the randomly variable turbulence created by the turning pedals, in order to create a more orderly air flow on the front surface of the rear shell 22. The rear edge of the nose piece terminates in front of the rearwardmost point of the front wheel 42.

Near its upper surface, the nose piece 38 departs from the generally uniformly rounded curvature and terminates in an upper flat shelf portion 50. The curvature of the nose piece 38 below the shelf portion 50 initiates the neck of the pear shape illustrated in FIG. 4 and gently continues the exterior surface curvature from the nose piece 38 into the wind screen 40. The wind screen 40 is attached to the nose piece 38 by conventional fasteners 52.

The wind screen 40 tapers upwardly from the shelf portion 50 over the top of and to the rear of the handlebars 54 of the bicycle 24, as shown in FIG. 2. The wind screen 40 also curves outwardly and rearwardly in the longitudinal horizontal plane, as shown in FIG. 3. The rear edge of the wind screen has a slight forward projection to clear the handlebars 54. In the vertical transverse plane illustrated in FIG. 4, the wind screen has a profile which tapers upward and inwardly from the shelf portion 50 to a point approximately equal in height to the handlebars 54, and from that location the profile continues upward in somewhat of a bullet-type configuration. The wind screen is transparent so the rider can see through it. The wind screen 40 is molded from transparent acrylic plastic. The acrylic plastic should have sufficient rigidity and strength to meet safety requirements. The U.S. Department of Transportation Type 48 acrylic plastic has been employed.

The vertical transverse pear-shaped profile of the shell 20, as shown in FIG. 4, provides a flow stream of air generally on each transverse side of and above the bicycle rider. The upper bullet-shaped portion of the wind screen 40 causes a plume-like or halo-like air flow above the head of the rider. Up to thirty-eight percent of the rider is protected by the air flow effects from the wind screen 40 at a bicycle speed of eighteen miles per hour.

The front shell 20 is intended to be used in conjunction with and operatively attached to the bicycle by the conventional front luggage and bag rack 28, as illustrated in FIGS. 2 and 6. The conventional front rack 28 is defined by a number of bars or rods connected together to form a generally horizontal luggage support framework 56 and a pair of support rods 58 extending downwardly therefrom on opposite transverse sides of the front wheel 42. The lower ends of the support rods 58 contact and attach to the lower end of the front wheel support fork 30 at a location near the axle of the front wheel 42. The lower ends of the support rods 58 are attached by bolts 59 or other conventional fasteners to the fork 36. The support framework 56 is attached to the back of the fork in the conventional manner. The forward end of the framework 56 extends freely above and over the front wheel 42. In order to operatively connect the front shell 20 to the front luggage rack 28, a pair of hinge brackets 60 is attached to the skirts 46 at a position near the lowermost points 41 thereof (FIG. 2). Each bracket 60 is generally L-shaped and one portion 62 of the bracket is directly attached to the skirts 46 adjacent the slot 44. The other upstanding portion 64 of the bracket 60 extends upwardly from the edge of the slot 44 and is pivotably connected to a fastener such as the bolt 59 extending from the fork 36 through the bottom end of the support rod 58. As a result, the front shell 20 is pivotably connected on opposite sides of the front fork 30 at positions closely adjacent to the rotational axis of the front wheel 42. The front shell can be pivoted forward about these pivot points, as shown in FIG. 6, to gain access to the bags 26 and racks 28 for using them in the conventional manner.

To maintain the front shell 20 in its upright position of use illustrated in FIGS. 1, 2 and 3, a T-shaped bracket 66 is connected to extend in front of the framework 56. A longitudinal arm 68 of the bracket 66 extends in the plane of the front wheel, and a transverse arm 70 of the bracket 66 is adapted to contact the interior surface of the nose piece 38. The transverse arm 70 stabilizes the front shell 20. The front shell 20 is held in the upright position by an elastic cord 72 which extends behind the front fork pivot tube 73 of the bicycle frame. The ends of the cord 72 are releasably connected in the conventional manner to the rear edge of the shelf portion 50. As shown in FIG. 6, the cord 72 may also be looped over the arm 70 of bracket 66 to support the front shell in its downward position and prevent the shell from touching the ground.

Although the front shell 20 can be employed to substantially frontally surround and shield conventional rectangularly-shaped front luggage bags 26, another feature of the invention is to provide contoured front luggage bags 74 and 76 which generally fit within and occupy the substantial majority of the interior space within the nose piece 38, as shown in FIGS. 7A, 7B and 7C. The contoured luggage bags 74 and 76, when attached to one another and to the conventional rack 28, generally conform to the inner shape of the nose piece. The inner shape of the nose piece is similar to the outer shape, except for the intervention of the wheel 42 and fork 30. The contoured side bags 74 are attached to the rack 28 by an arrangement similar to that employed on conventional panniers or luggage bags, i.e., hooks (not shown) are provided at the top of the bags 74 for clipping over the framework 56 and elastic cords (also not shown) on the backs of the bags 74 hold them against vertical upward and transverse outer movement. The shape of the side bags 74 are mirror images of one another. The contoured top bag 76 is attached to the contoured side bags 74 by a separating zipper 78. One part of the separating zipper 78 extends longitudinally along the outer upper edge of each side bag 74 and longitudinally along the lower transverse outer edges of the top bag 76. Conventional stiffeners (not shown) may be used in the bags 74 and 76 if desired. The shapes of the bags shown in FIGS. 7A, 7B and 7C are those which result when the bags are fully packed. When less than fully packed, there is no adverse consequence because the rigid aerodynamic structure of the front shell 20 provides a desired increase in aerodynamic efficiency.

Figure 5:
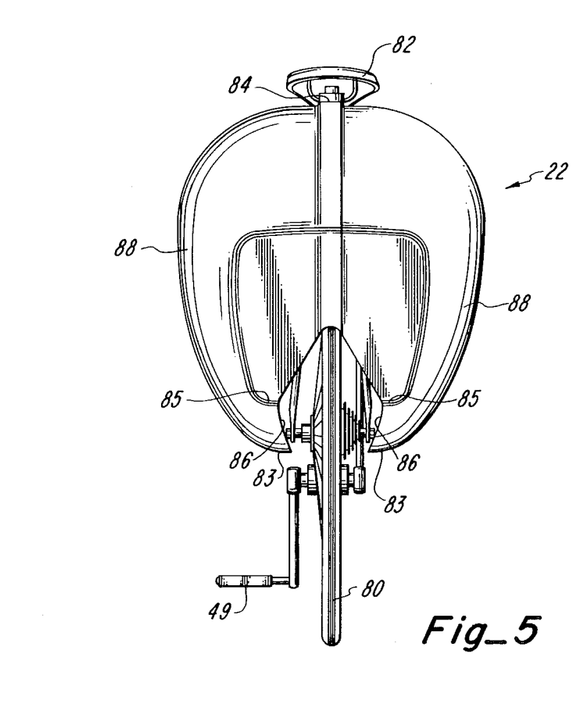
FIG. 5 is a rear view of the rear aerodynamic shell attached to the bicycle shown in FIG. 1.

Because the rotating pedals 49 and pumping motion of the rider's legs provide continuously variable aerodynamic effects in the area between the front wheel 42 and the bicycle rear wheel 80, it is desirable to provide the rear shell 22 with its own independent aerodynamic shape, as illustrated primarily in FIGS. 2, 3 and 5. As shown in FIG. 2, a front leading surface of the shell 22 is tapered primarily downwardly and rearwardly from a forwardmost upper point 81 generally behind the bicycle seat 82 to a lowermost point 83 located approximately at or slightly behind the rotation axis of the rear wheel 80. This downward rear curvature of the leading surface from the forwardmost point 81 forces the air flowing thereover somewhat downwardly to thereby develop a little lift to counteract the weight on the rear rack 34. From the forwardmost point 81 of the rear shell 22, a top surface curves at a relatively large curvature upwardly and rearwardly to an uppermost point 84, and then downwardly and rearwardly in a curve which generally complements and completes the curvature initiated by the forward leaning arc of the rider's back. By generally continuing the curvature of the rider's back, the flow stream of air over the rider's back is generally continued without major disruption, or creating additional turbulence, thereby reducing drag. From the lowermost point 83 of the rear shell 22, the lower bottom surface extends upwardly and rearwardly generally in a linear manner to a rearwardmost point 85. The lower bottom surface of the rear shell between points 83 and 85 commences bringing the air separated by the rear shell 22 back together behind the shell 22, as does the upper surface behind the uppermost point 84. A generally flat upright rear surface extends from the rearwardmost point 85 of the shell 22 up to the rearward termination of the down and rearwardly curved upper surface behind the uppermost point 84. This generally flat upright rear surface causes the air to collapse behind the rear shell 22.

The vertical transverse profile of the rear bag, as shown in FIG. 5, is generally the shape of the Greek letter Omega. Relatively large curvatures are provided to avoid turbulence from more sharply rounded corners. THe maximum transverse width of the rear shell 22 occurs at a height equal to the height of the rear wheel 80. This maximum transverse width is generally similar to the maximum transverse width of the nose piece 38 at a similar height to continue the flow stream created by the front shell 20 and gently collapse it behind the rear shell 22. In the horizontal longitudinal profile shown in FIG. 3, the rear bag 22 is somewhat of apple-shaped with outer rounded transverse ends at a maximum transverse width at the front of the shell 22. The side wall surfaces extend rearward from the points of maximum width in a gentle rearward and inwardly converging curve to the flat rearward surface, also for the purpose of gently collapsing the air behind the rear shell.

As can be seen in FIG. 3, the leading surface of the rear shell 22 extends continuously transversely across the front of the rear shell. The leading surface initiates new aerodynamic flow stream effects over the rear shell. The surface 48 of the skirts 46 of the front shell 22 (FIG. 2) help create positive flow effects over the leading surface of the rear shell by slightly pressurizing the area in front of this leading surface. A center opening or slot 86 is provided through the leading lower portion of the surface of the shell 22 to accommodate the width of the rear wheel 80, as shown in FIGS. 2 and 5. The edges of the slot 86 in the leading surface are closely spaced from the rear wheel 80 to cause the front surface to be as effective as possible in forcing air to the outside over the rear shell. The slot 86 has the effect of breaking up or reducing the fan effect created by the rotating spokes of the rear wheel to further increase the aerodynamic efficiency by reducing fan spoke turbulence.

The rear shell 22 is an enclosure formed by a pair of outwardly pivotable and separable shell half portions 88, each of which is a substantial mirror image of the other. The shell halves are joined along a center line at approximately the longitudinal plane of the rear wheel 80 by conventional fasteners to create the shape of the rear shell 22. Each shell half portion thereby partially defines the surfaces of the rear shell.

Each shell half 88 is pivotably connected along its lower rearward and upward extending surface to a support bracket 90, as shown in FIG. 8. The support bracket 90 is rigidly connected to the rear luggage rack 34 and extends on opposite transverse sided of the rear wheel. The rear luggage rack 34 includes the conventional horizontal luggage support framework 92 from which downwardly extending support rods 94 extend on opposite transverse sides of the rear wheel 80. The lower ends of the support rods 94 are connected to the rear wheel support fork 36 by a conventional fastener such as a bolt 95. The front end of the support bracket 90 on each side of the rear wheel is also connected to this same fastener. The bracket 90 linearly extends rearwardly and upwardly on each transverse side of the rear wheel to a rearwardmost point, and from there upward and forward to a single uppermost point as shown in FIG. 2. The single upwardmost point of the support bracket 90 is attached to the center rear point of the luggage framework 92, preferably by a conventional fastener. The support bracket 90 is therefore rigidly positioned with respect to the bicycle frame, by use of the conventional rear luggage rack 28. Each shell half 88 is pivotably connected to the support bracket 90 by means of a pair of longitudinally spaced flexible hinge flaps 96. Each hinge flap 96 is rigidly attached at opposite ends to the support bracket 90 and to a shell half at a position along its upward and rearward extending rear surface. As a consequence, the two shell halves defining the rear shell 20 are free to pivot outwardly and downwardly from the top portions thereof, as illustrated in FIG. 8. A belt 97 is connected between the top inner-contacting edges of each shell half 88 to prevent the shell halves from pivoting outwardly and downwardly in contact with the ground. Access is provided to the rear luggage racks 34 for the purpose of attaching conventional rectangular luggage bags 32, or contoured rear bags 98 and 99 which are adapted to fit within and generally conform to the interior shape of the rear shell 22.

The contoured side bags 98 shown in FIGS. 9A, 9B and 9C are attached in the conventional manner by hooks (not shown) to the framework 92 of the rear rack 34. In a manner similar to that employed in conventional panniers or rectangular luggage bags, an elastic cord (also not shown) prevents upward and outward movement with respect to the rear luggage rack 34. The shape of the side bags 98 are mirror images of one another. The contoured top bag 99 and side bags 98 are connected along longitudinal contacting edges by a separating zipper 100 which has portions thereof attached to the side bags 98 and top bag 99. In this manner, the three bags 98 and 99 are firmly retained to the conventional rear luggage rack 34.

The nose piece 38 and rear shell halves 88 are preferably formed by laying up resin-impregnated fiberglass mat in molds having complementary shapes to the nose piece and shell half portions. The weight should be kept to a minimum, and hence the laminated fiberglass structure should be as thin as possible and yet provide the necessary rigid structure of the aerodynamic effects and provide durability against breakage. The thickness of the fiberglass side walls of each of the nose piece 38 and shell halves 88 is approximately uniform throughout and the contour of the interior surface of each of the shells is generally parallel to the exterior surface. The contoured luggage bags 74, 76, 98 and 99, are thereby constrained to an outer configuration or shape somewhat similar to but smaller than the outer surfaces herein described for the front and rear shells 20 and 22.

Aerodynamic free roll tests have determined that use of the front shell 20 and rear shell 22 improves the aerodynamic efficiency of the bicycle. A free roll test was first conducted on the bicycle with a rider thereon. Another free roll test was then conducted with the same bicycle and rider but with the front shell 20 and the rear shell 22 attached. Approximately a nine percent increase in aerodynamic efficiency was obtained by use of the shells 20 and 22, in relation to the bicycle and rider themselves. Next, a free roll test was conducted with the same bicycle and rider after removing the shells 20 and 22 and attaching luggage to the bicycle of approximately the same volume as can be shielded by the shells 20 and 22. The weight of the luggage attached was minimized as much as possible so that its size and aerodynamic drag was the primary factor influencing the test roll results. Approximately a twenty-six percent increase in aerodynamic efficiency was obtained by use of the shells 20 and 22, in relation to the bicycle and rider with the attached lightweight luggage. The substantial increase in aerodynamic efficiency also results in significantly reduced pedal effort required by the rider. Pedal effort increases exponentially with bicycle speed. Use of the shells 20 and 22 causes the pedal effort to also increase exponentially, but the rate of increase is considerably less. At higher speeds, the pedal effort is substantially reduced.

The shells 20 and 22 offer the substantial advantage that additional special equipment is not required for use of the aerodynamic shells 20 and 22 because conventional luggage bags or panniers can be retained for use with the front and rear aerodynamic shells and the shells are pivotably connected directly to luggage racks. The relatively sturdy but light construction of the front and rear shells 20 and 22 add little weight to the bicycle, and the net effect, even with the added weight of the shells, is a substantial reduction in pedaling effort in the normal touring bicycle riding speed range of between five and twenty miles per hour.

The nature and advantages of the aerodynamic shells of the present invention have been shown and described with a degree of specificity. It should be understood, however, that the specificity of the description has been made by way of preferred example and that the invention is defined by the scope of the appended claims.

What is claimed is:

1. A relatively rigid and aerodynamically shaped front shell adapted to be connected to the front of a bicycle having a front luggage rack connected to a front wheel support fork of the bicycle and luggage bags connected to the front luggage rack to shield the luggage bags and front luggage racks from air flowing thereover and to provide increased aerodynamic efficiency of the bicycle in a speed range of up to approximately twenty miles per hour, said front shell comprising:
   a nose piece having a forwardmost location approximately at the same height as the top of the front bicycle wheel and from which continuous and generally rounded curves extend rearwardly along the longitudinal dimension of the bicycle and outwardly in a transverse vertical plane with respect to the bicycle to a rear edge of the nose piece;
   said nose piece having an interior within which to receive the front luggage rack and luggage bags connected thereto; and
   the rear edge of said nose piece being located at a position forward of the rearwardmost location of the front bicycle wheel.

2. A front shell as defined in claim 1 wherein the continuous curves extending rearwardly and outwardly from the forwardmost location of the nose piece terminate at the rear edge of the nose piece, and the interior of the nose piece extends forward from the rear edge.

3. A front shell as defined in claim 2 wherein the maximum horizontal width of the nose piece at any horizontal location in a transverse vertical plane occurs approximately at the rear edge of the nose piece.

4. A front shell as defined in claim 1 wherein said nose piece further defines a slot extending upwardly along a vertical longitudinal plane from a lower bottom edge of the nose piece, the slot receiving therein an upper portion of the bicycle front wheel.

5. A front shell as defined in claim 4 wherein the slot divides a lower portion of the nose piece into a pair of transversely spaced skirts which extend on opposite transverse sides of the front wheel.

6. A front shell as defined in claim 5 wherein the skirts extend to a lowermost location approximately in the vicinity of the rotational axis of the front wheel.

7. A front shell as defined in claim 6 further comprising means for operatively pivotably connecting both skirts to the bicycle front wheel support fork in the vicinity of the rotational axis of the front wheel.

8. A front shell as defined in claim 7 wherein said pivotable connecting means pivotably connects both skirts to the front luggage rack.

9. A front shell as defined in claim 6 wherein a lower rear surface of each skirt in a longitudinal vertical plane extends upwardly and rearwardly from the lowermost location and terminates at the rear edge at a height greater than the height of the lowermost location.

10. A front shell as defined in claim 5 wherein the skirts substantially reduce the fan effect created by spokes of the front bicycle wheel when operated in said speed range.

11. A front shell as defined in claim 1 further comprising means pivotably connecting the nose piece to the front wheel support fork of the bicycle for movement with respect to the front luggage rack to gain access to the front luggage rack and the luggage bags attached thereto.

12. A front shell as defined in claim 11 further comprising a relatively rigid wind screen attached to the nose piece and extending generally above the handlebars of the bicycle.

13. A front shell as defined in claim 12 wherein the nose piece and attached wind screen have a combined outer profile which is generally pear-shaped in a transverse vertical plane.

14. A front shell as defined in claim 12 wherein the wind screen extends a sufficient height above the nose piece to cause a plume air flow effect over the head of the bicycle rider at a speed near the upper limit of said speed range.

15. A front shell as defined in claim 12 wherein the upper profile of the wind screen is generally bullet-shaped in a transverse vertical plane.

16. A fronts shell as defined in claim 15 wherein the width of the wind screen in the transverse vertical plane is less than the width of the handlebars in said plane.

17. A front shell as defined in claim 12 wherein said wind screen is substantially transparent.

18. A front shell as defined in claim 14:
   wherein the nose piece includes a shelf portion which is located at an upper location on the nose piece and which is generally flat and horizontal, and;
   further comprising a relatively rigid wind screen attached to the nose piece at the shelf portion.

19. A front shell as defined in claims 12 or 18 wherein the nose piece and the wind screen are curved to create a continuously curved transition between the nose piece and the wind screen in the area where the nose piece and wind screen are attached to one another.

20. A relatively rigid aerodynamically shaped shell for shielding or enclosing primarily luggage attached in the vicinity of the front or rear wheels of a bicycle and achieving increased aerodynamic efficiency of the bicycle primarily from reduced aerodynamic drag of the luggage in the speed range of approximately five to twenty miles per hour as compared to the same bicycle with the same luggage attached but without said shell, wherein said shell is adapted to also substantially shield or enclose luggage racks attached to the bicycle and luggage and luggage bags attached to the luggage racks, and wherein said luggage bags are contoured to generally conform at least in part to an interior shape of said shell, and the interior shape of said shell is generally similar to the outer shape of said shell.

* * * * *